United States Patent
McDermott et al.

(10) Patent No.: US 12,017,120 B2
(45) Date of Patent: Jun. 25, 2024

(54) GOLF BALLS HAVING INCREASED IMPACT DURABILITY

(71) Applicant: Acushnet Company, Fairhaven, MA (US)

(72) Inventors: Erin McDermott, Providence, RI (US); Manjari Kuntimaddi, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/855,923

(22) Filed: Jul. 1, 2022

(65) Prior Publication Data

US 2024/0001202 A1  Jan. 4, 2024

(51) Int. Cl.
*A63B 37/06* (2006.01)
*A63B 37/00* (2006.01)
*C08L 9/00* (2006.01)

(52) U.S. Cl.
CPC ...... *A63B 37/0063* (2013.01); *A63B 37/0051* (2013.01); *A63B 37/0065* (2013.01); *C08L 9/00* (2013.01); *A63B 37/0074* (2013.01); *A63B 37/0075* (2013.01); *A63B 37/0076* (2013.01); *C08L 2312/00* (2013.01)

(58) Field of Classification Search
CPC ............ A63B 37/0062; A63B 37/0063; A63B 37/005
See application file for complete search history.

(56) References Cited

U.S. PATENT DOCUMENTS

| | | | |
|---|---|---|---|
| 10,882,979 B2 | 1/2021 | Yamanaka et al. | |
| 11,266,882 B2 | 3/2022 | Hayashi et al. | |
| 2020/0001142 A1* | 1/2020 | Yamanaka | A63B 37/00776 |
| 2020/0101353 A1* | 4/2020 | Nagakura | A63B 37/00622 |
| 2020/0101354 A1* | 4/2020 | Nagakura | C08L 9/00 |
| 2020/0129815 A1* | 4/2020 | Hayashi | A63B 37/0075 |
| 2020/0206573 A1* | 7/2020 | Takihara | A63B 37/0096 |
| 2020/0206574 A1* | 7/2020 | Inoue | A63B 37/0031 |
| 2020/0206576 A1* | 7/2020 | Takihara | A63B 37/00921 |

* cited by examiner

*Primary Examiner* — Raeann Gorden
(74) *Attorney, Agent, or Firm* — Bradley Arant Boult Cummings LLP

(57) ABSTRACT

Golf balls having cores with increased hardness gradients and improved impact durability are provided. The cores have an increased "positive" hardness gradient (or a "hard-to-soft" hardness) where the outer surface of the core is harder than the center. The cores are formed from rubber formulations including combinations of a terpene-based resin, ethylene-propylene-diene (EPDM) rubber, and/or a water releasing agent. The resulting golf balls have increased impact durability and resilience.

20 Claims, 2 Drawing Sheets

GOLF BALLS HAVING INCREASED IMPACT DURABILITY

FIELD OF THE INVENTION

The present disclosure relates generally to golf balls. More particularly, the present disclosure relates to golf balls having cores formed from rubber formulations including combinations of a terpene-based resin, ethylene-propylene-diene (EPDM) rubber, and/or a water releasing agent. The resulting golf balls have increased impact durability.

BACKGROUND OF THE INVENTION

Solid golf balls are typically made with a solid core encased by a cover, both of which can have multiple layers, such as a dual core having a solid center (or inner core) and an outer core layer, or a multi-layer cover having inner and outer cover layers. Generally, golf ball cores and/or centers are constructed with a thermoset rubber, such as a polybutadiene-based composition.

Thermoset rubbers are heated and crosslinked in a variety of processing steps to create a golf ball core having certain desirable characteristics, such as higher or lower compression or hardness, that can impact the spin rate of the ball and/or provide better "feel." These and other characteristics can be tailored to the needs of golfers of different abilities. For example, professional and highly skilled amateur golfers can place a back spin more easily on balls having a relatively high spin rate, which helps better control the ball and improves shot accuracy and placement. On the other hand, recreational players who cannot intentionally control the spin of the ball when hitting it with a club are less likely to use high spin balls. Due to the nature of thermoset materials and the heating/curing cycles used to form the materials into cores, manufacturers can achieve varying properties across the core (i.e., from the core surface to the center of the core).

In a conventional, polybutadiene-based core, the physical properties of the molded core are highly dependent on the curing cycle (i.e., the time and temperature that the core is subjected to during molding). This time and temperature history, in turn, is inherently variable throughout the core, with the center of the core being exposed to a different time/temperature (i.e., shorter time at a different temperature) than the surface (because of the time it takes to get heat to the center of the core) allowing a property gradient to exist at points between the center and core surface. This physical property gradient is readily measured as a hardness gradient.

The prior art contains a number of references that discuss "hard-to-soft" hardness gradients across a thermoset golf ball core. While these hardness gradients can help reduce the spin rate of the golf ball, high gradient core formulations generally require the use of high amounts of free radical initiators and cross-linking co-agents. Increased amounts of these additives can affect the impact durability of the resulting golf ball and lead to cracks within the golf ball cores upon impact with a golf club. Accordingly, it would be advantageous to design a core having a high hardness gradient between the center and core surface that also has enhanced durability and resilience.

SUMMARY OF THE INVENTION

The problems expounded above, as well as others, are addressed by the following inventions, although it is to be understood that not every embodiment of the inventions described herein will address each of the problems described above.

In some embodiments, a golf ball is provided, the golf ball including a core having an outer surface and a geometric center, wherein the core is formed from a rubber composition cured under heat, the rubber composition including a base rubber including polybutadiene rubber, ethylene-propylene-diene (EPDM) rubber, or a mixture thereof, a free radical initiator, a cross-linking co-agent, a terpene-based resin including a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof, wherein the geometric center and the outer surface each has a hardness and the hardness of the outer surface is greater than the hardness of the geometric center to define a positive Shore C hardness gradient of at least 25; and a cover layer surrounding the core.

In one embodiment, the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof. In other embodiments, the terpene-based resin is present in the rubber composition in an amount of about 1 phr to about 20 phr. In still other embodiments, the rubber composition further includes a water releasing agent, the water releasing agent including a metal sulfate hydrate having one to four waters of hydration. In further embodiments, the hardness of the geometric center ranges from about 45 Shore C to about 65 Shore C and the hardness of the outer surface ranges from about 70 Shore C to about 100 Shore C. In still further embodiments, the core has a compression of about 10 to about 110.

In other embodiments, a golf ball is provided, the golf ball including an outer core layer disposed over an inner core layer, wherein at least one of the outer core layer or the inner core layer is formed of a rubber composition cured under heat, the rubber composition including a base rubber including polybutadiene rubber, ethylene-propylene-diene (EPDM) rubber, or a mixture thereof, an organic peroxide, a cross-linking co-agent, a terpene-based resin including a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof, a water releasing agent including a metal sulfate hydrate having one to four waters of hydration, wherein the layer formed of the rubber composition has an outer surface and a geometric center, each having a hardness, and the hardness of the outer surface is greater than the hardness of the geometric center to define a positive Shore C hardness gradient of at least 25; and a cover layer surrounding the dual core.

In one embodiment, the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof. In another embodiment, the terpene-based resin is present in the rubber composition in an amount of about 1 phr to about 15 phr. In still another embodiment, the metal is an alkaline earth metal. In further embodiments, the water releasing agent is selected from calcium sulfate dihydrate, zinc sulfate dihydrate, or combinations thereof. In still further embodiments, the water releasing agent is present in the rubber composition in an amount of about 1 phr to about 3.9 phr. In yet further embodiments, the positive Shore C hardness gradient is about 30 to 50. In further embodiments, the cross-linking co-agent is present in the rubber composition in an amount of about 5 phr to 45 phr.

In still other embodiments, a golf ball is provided, the golf ball including a multi-layered core including a center and at least two core layers formed around the center, wherein at least one of the center or the at least two core layers is formed of a rubber composition cured under heat, the rubber composition including a base rubber including a mixture of polybutadiene rubber and ethylene-propylene-diene (EPDM) rubber, an organic peroxide, a cross-linking co-agent, a terpene-based resin including a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof, wherein the terpene-based resin is present in the rubber composition in an amount of about 5 phr to about 15 phr, a water releasing agent including a metal sulfate hydrate having one to four waters of hydration, wherein the water releasing agent is present in the rubber composition in an amount of about 1 phr to about 3.9 phr, wherein the layer formed of the rubber composition has an outer surface and a geometric center, each having a hardness, and the hardness of the outer surface is greater than the hardness of the geometric center to define a positive Shore C hardness gradient of at least 30; and a cover layer surrounding the multi-layered core.

In one embodiment, the polybutadiene is present in the mixture in an amount of about 70 phr to about 99 phr and the EPDM rubber is present in the mixture in an amount of about 1 phr to about 30 phr. In another embodiment, the organic peroxide includes dimethyl terbutyl peroxide, dicumyl peroxide, or combinations thereof. In still another embodiment, the cross-linking co-agent includes a zinc salt of an acrylate, diacrylate, methacrylate, or dimethacrylate. In still other embodiments, the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof. In further embodiments, the water releasing agent is selected from calcium sulfate dihydrate, zinc sulfate dihydrate, or combinations thereof.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
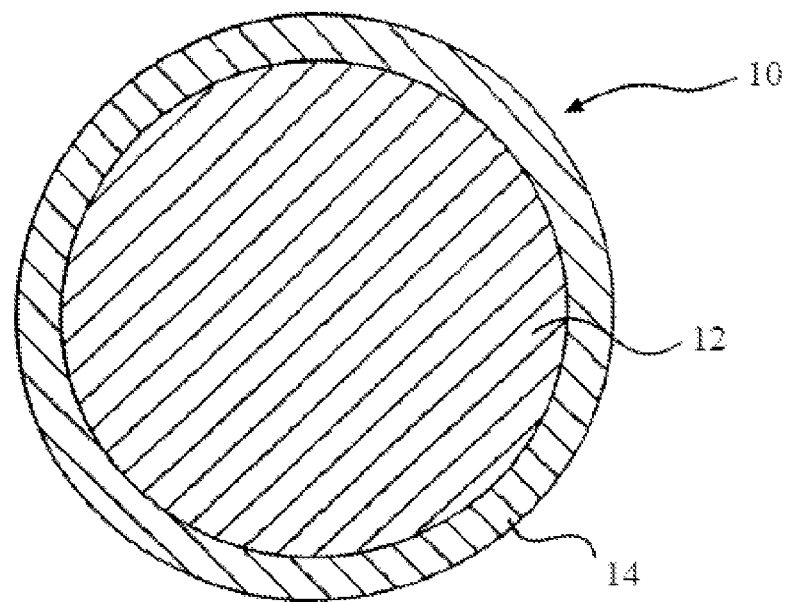
FIG. 1 is a cross-sectional view of a two-piece golf ball in accordance with an embodiment of the present disclosure.

The present disclosure provides golf balls having cores with increased hardness gradients and improved durability. In some embodiments, the present disclosure provides golf balls having cores with an increased "positive" hardness gradient (or a "hard-to-soft" hardness) where the outer surface of the core is harder than the center. While an increased hardness gradient in the core makes it possible to reduce the spin rate of the golf ball, high gradient cores often tend to weaken the impact durability of the ball. The inclusion of certain additives, such as a terpene-based resin, a water releasing agent, and ethylene-propylene-diene (EPDM) rubber, whether used in various combinations or individually, in the core formulations of the present disclosure results in an improvement in the durability of golf balls by improving the durability of the golf ball core. Without being bound by any particular theory, the inventors of the present disclosure have discovered that a golf ball having both an increased "positive" hardness gradient and increased impact durability can be achieved by including two or more of these additives in the core rubber formulation during the curing process.

Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "positive hardness gradient" refers to the result of subtracting the hardness value at the innermost portion of the component being measured (for example, the center of a solid core or an inner core in a dual core construction) from the hardness value at the outer surface of the component being measured (for example, the outer surface of a solid core or the outer surface of an inner core in a dual core). For instance, if the outer surface of a solid core has a greater hardness value than the center, the hardness gradient will be deemed a "positive" gradient.

The term "parts per hundred," also known as "phr," is defined as the number of parts by weight of a particular component present in a mixture, relative to 100 parts by weight of the base rubber component.

Core Formulations

The present disclosure provides golf balls having core formulations that result in increased "positive" hardness gradients across the core and improved impact durability. In some embodiments, the core formulations of the present disclosure include a base rubber, such as polybutadiene, EPDM, and mixtures thereof, a cross-linking agent, a free radical initiator, a water releasing agent that is capable of releasing water into the rubber formulation during the curing process, a terpene-based resin that is capable of imparting improved impact durability properties, and any combination of the foregoing. The core formulations may also optionally include other additives, such as one or more of a metal oxide, metal fatty acid or fatty acid, antioxidant, soft and fast agent, or fillers.

Base Rubber

The core formulations of the present disclosure include a base rubber. In some embodiments, the base rubber may include natural and synthetic rubbers and combinations of two or more thereof. Examples of natural and synthetic rubbers suitable for use as the base rubber include, but are not limited to, polybutadiene, polyisoprene, ethylene propylene rubber (EPR), ethylene-propylene-diene (EPDM) rubber, grafted EPDM rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

In some embodiments, the core formulations may include polybutadiene rubber as the base rubber. The polybutadiene rubber can have various combinations of cis- and trans-bond structures. In one embodiment, the polybutadiene rubber has a 1,4 cis-bond content of at least 40 percent. In other embodiments, the polybutadiene rubber has a 1,4 cis-bond content of at least 80 percent. In still other embodiments, the polybutadiene rubber has a 1,4 cis-bond content of at least 90 percent. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with the present disclosure, include, but are not limited to, BR 01 and BR 1220, available from BST Elastomers of Bangkok, Thailand; SE BR 1220LA and SE BR1203, available from DOW Chemical Co. of Midland, Mich.; BUDENE 1207, 1207s, 1208, and 1280 available from Goodyear, Inc. of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. of Seoul, South Korea; DIENE 55NF, 70AC, and 320 AC, available from Firestone Polymers of Akron, Ohio; and combinations of two or more thereof.

In further embodiments, the core formulations may include EPDM rubber as the base rubber. That is, the entire core or at least one core layer in a multi-layered structure may be formed of EPDM rubber as the base rubber. The EPDM rubber may be any commercially available EPDM rubber, including, for example, Dow Nordel® IP 5565 EPDM. In further embodiments, the core formulations may include grafted EPDM rubber as the base rubber. In still further embodiments, the core formulations may include a combination of EPDM rubber and grafted EPDM rubber.

The core formulations may include a single base rubber or a combination of two or more of the above-described rubbers as the base rubber. In some embodiments, the core formulations may include EPDM rubber or grafted EPDM rubber as the base rubber. In further embodiments, the core formulations may include polybutadiene rubber, such as high cis-1,4 polybutadiene, as the base rubber. In this embodiment, the core formulation may include a combination of two or more types of polybutadiene rubber, such as two or more different types of high cis-1,4 polybutadiene. In still further embodiments, the core formulations may include a combination of polybutadiene rubber and EPDM rubber as the base rubber. For example, the core formulations may combine EPDM rubber and two or more different types of polybutadiene rubber, such as two or more different types of high cis-1,4 polybutadiene, as the base rubber.

In some embodiments, the core formulations include the base rubber in an amount of 100 phr. That is, when more than one rubber component is used in the core formulation as the base rubber, the sum of the amounts of each rubber component should total 100 phr. In some embodiments, the core formulations include polybutadiene rubber as the base rubber in an amount of 100 phr. In further embodiments, the core formulations may include EPDM rubber as the base rubber in an amount of 100 phr. In other embodiments, the core formulations may include polybutadiene rubber and a second rubber component. In this embodiment, the polybutadiene rubber may be used in an amount of about 70 phr to about 99 phr and the second rubber component may be used in an amount of about 1 phr to about 30 phr. In still other embodiments, the polybutadiene rubber may be used in an amount of about 85 phr to about 97 phr and the second rubber component may be used in an amount of about 3 phr to about 15 phr. In yet other embodiments, the polybutadiene rubber may be used in an amount of about 90 phr to about 95 phr and the second rubber component may be used in an amount of about 5 phr to about 10 phr. In some embodiments, the second rubber component is EPDM rubber.

The base rubber may be used in the core formulation in an amount of at least about 5 percent by weight based on total weight of composition. In some embodiments, the base rubber may be used in an amount of about 20 percent to about 95 percent by weight. In further embodiments, the base rubber may be used in an amount of about 45 percent to about 95 percent by weight. In still other embodiments, the base rubber may be used in an amount of at least about 50 percent by weight. In yet further embodiments, the base rubber may be used in an amount of at least about 70 percent by weight.

Cross-Linking Agent

The core formulations include a reactive cross-linking co-agent. Suitable cross-linking co-agents include, but are not limited to, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. Examples of suitable metal salts include, but are not limited to, one or more metal salts of acrylates, diacrylates, methacrylates, and dimethacrylates, wherein the metal is selected from magnesium, calcium, zinc, aluminum, lithium, or nickel. In some embodiments, the cross-linking co-agent is selected from zinc salts of acrylates, diacrylates, methacrylates, or dimethacrylates. For example, in one embodiment, the cross-linking co-agent is zinc diacrylate (ZDA).

The cross-linking co-agent may be present in the core formulation in an amount of about 5 phr to about 50 phr. In some embodiments, the cross-linking co-agent may be present in the core formulation in an amount of about 10 phr to about 45 phr. In further embodiments, the cross-linking co-agent may be present in the core formulation in an amount of about 15 phr to about 40 phr. In still further embodiments, the cross-linking co-agent may be present in the core formulation in an amount of about 20 phr to about 35 phr. For example, in one embodiment, the cross-linking co-agent may be present in the core formulation in an amount of about 30 phr. In other embodiments, the cross-linking co-agent may be present in the core formulation in an amount of about 35.5 phr.

Free Radical Initiator

The core formulations may include a free radical initiator selected from an organic peroxide, a high energy radiation source capable of generating free radicals, or a combination thereof. In some embodiments, the free radical initiator is an organic peroxide. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; dimethyl terbutyl peroxide blend; and combinations thereof. In one embodiment, the free radical initiator is dicumyl peroxide, including, but not limited to Perkadox® BC, commercially available from Akzo Nobel. In other embodiments, the free radical initiator is dimethyl terbutyl peroxide, including, but not limited to Trigonox® 101-50D-PD, commercially available from Nouryon.

The free radical initiator may be present in the core formulation in an amount of about 0.05 phr to about 15 phr. In some embodiments, the free radical initiator may be present in the core formulation in an amount of about 0.1 phr to about 10 phr. In other embodiments, the free radical initiator may be present in the core formulation in an amount of about 0.5 phr to about 6 phr. In still other embodiments, the free radical initiator may be present in the core formulation in an amount of about 1 phr to about 5 phr. In further embodiments, the free radical initiator may be present in the core formulation in an amount of about 1.5 phr to about 3 phr. In yet further embodiments, the free radical initiator is present in the core formulation in an amount of about 0.1 phr to about 2.5 phr. In still further embodiments, the free radical initiator is present in the core formulation in an amount of about 0.25 phr to about 1.5 phr. For example, the free radical initiator may be present in the core formulation in an amount of about 0.35 phr. In other embodiments, the free radical initiator may be present in the core formulation in an amount of about 0.6 phr. In still other embodiments, the free radical initiator may be present in the core formulation in an amount of about 1 phr.

Water Releasing Agent

The core formulations of the present disclosure may include a water releasing agent. A "water releasing agent," as used herein, refers to a compound having at least one water molecule available for release during the curing process. When the free radical initiator decomposes to generate decomposition heat at the time of curing of the core, the temperature near the surface of the core is kept substantially the same as the temperature of the mold, while the temperature near the center of the core increases because of the accumulated decomposition heat of the free radical initiator. Without being bound by any particular theory, it is believed that, by adding a water releasing agent to the core formulation that can release water at the desired curing temperature, the water can promote further decomposition of the free radical initiator and deactivation of radicals at the center of the core, which, in turn, results in a difference in crosslinking density and an increased hardness gradient between the center and the surface. By increasing the hardness gradient from the outer surface of the core to the center, it is possible to reduce the spin rate of the golf ball and maintain sufficient durability.

The water releasing agent of the present disclosure has a moisture content capable of releasing a sufficient amount of water to promote decomposition of the free radical initiator and deactivation of radicals during the curing process. In some embodiments, the water releasing agent has a moisture content (in its molecular form) of at least about 5 percent by mass. In further embodiments, the water releasing agent has a moisture content ranging from about 5 percent by mass to about 95 percent by mass. In still further embodiments, the water releasing agent has a moisture content ranging from about 10 percent by mass to about 90 percent by mass. In yet further embodiments, the water releasing agent has a moisture content ranging from about 15 percent by mass to about 85 percent by mass. In further embodiments, the water releasing agent has a moisture content of at least about 50 percent by mass. For example, the water releasing agent has a moisture content of about 50 percent by mass to about 95 percent by mass.

In some embodiments, the water releasing agent of the present disclosure may be a metal sulfate hydrate having one or more waters of hydration capable of being released during the reactions of the present disclosure. In one embodiment, the metal may be an alkaline earth metal. For example, the metal may be calcium, magnesium, beryllium, strontium, barium, or radium. In one embodiment, the metal of the metal sulfate hydrate is calcium. In another embodiment, the metal of the metal sulfate hydrate is magnesium. In further embodiments, the metal may be a transition metal or a post-transition metal. For instance, the metal may be zinc, copper, iron, cobalt, manganese, chromium, nickel, aluminum, zirconium, cadmium, indium, or vanadium. In still further embodiments, the metal may be neodymium or lanthanum. In some embodiments, the metal of the metal sulfate hydrate is zinc.

The metal sulfate hydrate may have any number of waters of hydration. In some embodiments, the metal sulfate hydrate may have from 0.5 to ten waters of hydration. For instance, the metal sulfate hydrate may be a hemihydrate, monohydrate, dihydrate, trihydrate, tetrahydrate, pentahydrate, hexahydrate, heptahydrate, octahydrate, nonahydrate, or decahydrate. In further embodiments, the metal sulfate hydrate may have from one to seven waters of hydration. In still further embodiments, the metal sulfate hydrate may have from one to four waters of hydration. In yet further embodiments, the metal sulfate hydrate may have from one to three waters of hydration. In other embodiments, the metal sulfate hydrate may have two waters of hydration. For example, in one embodiment, the metal sulfate hydrate may be a dihydrate. In still further embodiments, the metal sulfate hydrate may be a heptahydrate (i.e., having seven waters of hydration).

Examples of suitable metal sulfate hydrates contemplated for use as the water releasing agent in accordance with the present disclosure include, but are not limited to, calcium sulfate dihydrate ($CaSO_4 \cdot 2H_2O$), magnesium sulfate heptahydrate ($MgSO_4 \cdot 7H_2O$), zinc sulfate dihydrate ($ZnSO_4 \cdot 2H_2O$), zinc sulfate heptahydrate ($ZnSO_4 \cdot 7H_2O$), vanadium oxide sulfate hydrate ($VOSO_4 \cdot xH_2O$), neodymium sulfate hydrate ($Nd_2(SO_4)_3 \cdot xH_2O$), lanthanum oxalate hydrate ($La_2(C_2O_4)_3 \cdot xH_2O$), zinc sulfate monohydrate ($ZnSO_4 \cdot H_2O$), zirconium sulfate hydrate ($Zr(SO_4)_2 \cdot xH_2O$), nickel sulfate heptahydrate ($NiSO_4 \cdot 7H_2O$), nickel sulfate hexahydrate ($NiSO_4 \cdot 6H_2O$), aluminum sulfate hydrate ($Al_2(SO_4)_3 \cdot xH_2O$), and copper sulfate pentahydrate ($CuSO_4 \cdot 5H_2O$).

The core formulations may include one or more of any of the water releasing agents described above. For example, the core formulations may include two or more of any of the metal sulfate hydrates described above. In some embodiments, the water releasing agent is present in the core formulation in an amount of about 1 phr to about 15 phr. In other embodiments, the water releasing agent is present in the core formulation in an amount of about 2 phr to about 10 phr. In still further embodiments, the water releasing agent is present in the core formulation in an amount of about 3 phr to about 8 phr. In yet further embodiments, the water releasing agent is present in the core formulation in an amount of about 5 phr to about 7 phr. In still further embodiments, the water releasing agent is present in the core formulation in an amount of about 1 phr to about 4 phr. In further embodiments, the water releasing agent is present in the core formulation in an amount of about 1 phr to about 3.9 phr. In still further embodiments, the water releasing agent is present in the core formulation in an amount of about 1 phr to about 3.75 phr. In yet further embodiments, the water releasing agent is present in the core formulation in an amount of about 1 phr to about 3 phr. For example, in some embodiments, the water releasing agent is present in the core formulation in an amount of about 3 phr.

Terpene Based Resin

The core formulations of the present disclosure include a terpene-based resin. When included in the core formulation, the terpene-based resin provides the resulting cores with improved impact durability properties. A "terpene-based resin," as used herein, refers to a polymer prepared, in whole or in part, from a terpene compound. The terpene-based resin of the present disclosure may include, but is not limited to, a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof.

In some embodiments, the terpene-based resin is a terpene polymer. The terpene polymer may be a homopolymer obtained by polymerizing a terpene compound. The terpene compound includes a hydrocarbon represented by a composition of $(C_5H_8)_n$, and an oxygen-containing derivative thereof, and is a compound having a terpene such as a monoterpene ($C_{10}H_{16}$), sesquiterpene ($C_{15}H_{24}$), or diterpene ($C_{20}H_{32}$) as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. The terpene polymer is obtained, for example, by polymerizing the above terpene compound. Examples of the terpene polymer include α-pinene polymer, β-pinene polymer, limonene polymer, dipentene polymer, and β-pinene/limonene polymer.

In further embodiments, the terpene-based resin is a terpene-phenol copolymer. The terpene-phenol copolymer is, for example, a copolymer of any of the above terpene compounds and a phenol-based compound. Examples of the phenol-based compound include, but are not limited to, phenol, cresol, xylenol, catechol, resorcin, hydroquinone, and bisphenol A. The terpene-phenol copolymer may have an acid value. The term, "acid value," as used herein refers to the amount in milligrams of potassium hydroxide required for neutralizing the acid included in one gram of the terpene-phenol copolymer, and is a value measured by a potentiometric titration method (JIS K 0070: 1992). In some embodiments, the acid value of the terpene-phenol copolymer may range from about 10 mgKOH/g to about 300 mgKOH/g. In other embodiments, the acid value of the terpene-phenol copolymer may range from about 35 mgKOH/g to about 250 mgKOH/g. In further embodiments, the acid value of the terpene-phenol copolymer may range from about 60 mgKOH/g to about 200 mgKOH/g. In still further embodiments, the acid value of the terpene-phenol copolymer may range from about 90 mgKOH/g to about 150 mgKOH/g. The terpene-phenol copolymer may also have a hydroxy value. The term, "hydroxy value," as used herein refers to the amount in milligrams of potassium hydroxide required for neutralizing acetic acid bonding to a hydroxyl group when one gram of the resin is acetylated, and is a value measured by a potentiometric titration method (JIS K 0070: 1992). In some embodiments, the hydroxy value of the terpene-phenol copolymer is about 30 mgKOH/g to about 150 mgKOH/g. In further embodiments, the hydroxy value is about 50 mgKOH/g to about 100 mgKOH/g.

In still further embodiments, the terpene-based resin is a terpene-styrene copolymer. The terpene-styrene copolymer may be, for example, a copolymer of any of the above terpene compounds and a styrene-based compound. Examples of the styrene-based compound include, but are not limited to, styrene and α-methylstyrene.

In yet further embodiments, the terpene-based resin is a terpene-phenol-styrene copolymer. The terpene-phenol-styrene copolymer may be, for example, a copolymer of any of the above terpene compounds, any of the above phenolic compounds, and any of the above styrene-based compounds. In some embodiments, the terpene-phenol-styrene copolymer is a copolymer of any of the above terpene compounds, phenol, and α-methylstyrene.

In some embodiments, the terpene-based resin is a hydrogenated terpene-phenol copolymer. The hydrogenated terpene-phenol copolymer may be obtained by hydrogenating any of the above terpene-phenol copolymers. In further embodiments, the terpene-based resin is a hydrogenated terpene-styrene copolymer. The hydrogenated terpene-styrene copolymer may be obtained by hydrogenating any of the above terpene-styrene copolymers. In still further embodiments, the terpene-based resin is a hydrogenated terpene-phenol-styrene copolymer. The hydrogenated terpene-phenol-styrene copolymer may be obtained by hydrogenating any of the above terpene-phenol-styrene copolymers.

In further embodiments, the terpene-based resin may be, for example, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof. In still further embodiments, the terpene-based resin may include any commercially available terpene-based resins, such as Sylvares TP2019, Sylvares TP7042, Sylvares TR7115, Sylvares TR7125, and Sylvatraxx 6720 available from Kraton Corporation; and YS RESIN PX 1150N and YS RESIN PX 1250 available from Yasuhara Chemical Co. Ltd.

In further embodiments, the terpene-based resin may be a compound having a structure represented by any of formulae (1) to (4):

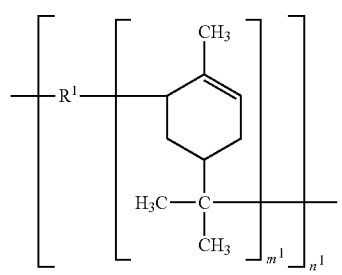

(1)

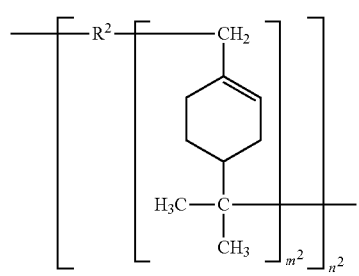

(2)

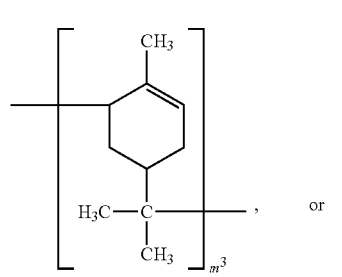

(3)

, or

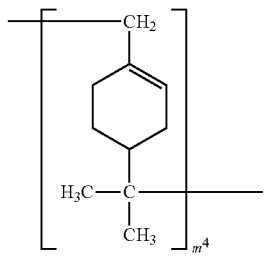

(4)

where, in formulae (1) to (4), $R^1$ and $R^2$ each independently represent a divalent residue of a phenol-based compound and/or a styrene-based compound, $m^1$ to $m^4$ each independently represent a natural number of 1 to 30, and $n^1$ to $n^2$ each independently represent a natural number of 1 to 20. The compounds having the structure represented by the above formulae (1) to (4) each have a structure derived from pinene in the molecule.

The compound having the structure represented by the formula (1) has a repeating unit consisting of a structural moiety derived from α-pinene and $R^1$ bonding to the structural moiety derived from α-pinene. $R^1$ may be a divalent residue where two hydrogen atoms are removed from the benzene ring of a phenol-based compound and/or a styrene-based compound. Examples of the compound having the structure represented by the formula (1) include a copolymer of α-pinene and a phenol-based compound and/or a styrene-based compound. Examples of the phenol-based compound include phenol, cresol, xylenol, catechol, resorcin, hydroquinone, and bisphenol A. Examples of the styrene-based compound include styrene, and α-methylstyrene.

In the formula (1), $m^1$ represents the degree of polymerization of the structural unit derived from α-pinene and is a natural number of 1 to 30. In some embodiments, $m^1$ may range from 1 to 30. In other embodiments, $m^1$ may range from 2 to 25. In other embodiments, $m^1$ may range from 5 to 20. In the formula (1), $n^1$ represents the degree of polymerization of the repeating unit consisting of the structural moiety derived from α-pinene and $R^1$ bonding to the structural moiety derived from α-pinene and is a natural number of 1 to 20. In some embodiments, $n^1$ may range from 2 to 20. In other embodiments, $n^1$ may range from 3 to 15.

The compound having the structure represented by the formula (2) has a repeating unit consisting of a structural moiety derived from β-pinene and $R^2$ bonding to the structural moiety in the molecule. Examples of the compound having the structure represented by the formula (2) include a copolymer of β-pinene and a phenol-based compound and/or a styrene-based compound. $R^2$ is a divalent residue where two hydrogen atoms are removed from the benzene ring of a phenol-based compound and/or a styrene-based compound. Examples of the phenol-based compound include phenol, cresol, xylenol, catechol, resorcin, hydroquinone, and bisphenol A. Examples of the styrene-based compound include styrene and α-methylstyrene.

In the formula (2), $m^2$ represents the degree of polymerization of the structural unit derived from β-pinene and is a natural number of 1 to 30. In some embodiments, $m^2$ may range from 1 to 30. In other embodiments, $m^2$ may range from 2 to 25. In other embodiments, $m^2$ may range from 5 to 20. In the formula (2), $n^2$ represents the degree of polymerization of the repeating unit consisting of a structural moiety derived from β-pinene and $R^2$ bonding to the structural moiety and is a natural number of 1 to 20. In some embodiments, $n^2$ may range from 2 to 20. In other embodiments, $n^2$ may range from 3 to 15.

The compound having the structure represented by the formula (3) is a polymer having a structural unit derived from α-pinene and is a polymer consisting of the structural unit derived from α-pinene. In the formula (3), $m^3$ represents the degree of polymerization of the structural unit derived from α-pinene and is a natural number of 1 to 30. In some embodiments, $m^3$ may range from 1 to 30. In other embodiments, $m^3$ may range from 2 to 25. In other embodiments, $m^3$ may range from 5 to 20.

The compound having the structure represented by the formula (4) is a β-pinene polymer having a structural unit derived from β-pinene in the molecule and is a polymer consisting of the structural unit derived from β-pinene. In the formula (4), $m^4$ represents the degree of polymerization of the structural unit derived from β-pinene and is a natural number of 1 to 30. In some embodiments, $m^4$ may range from 1 to 30. In other embodiments, $m^4$ may range from 2 to 25. In other embodiments, $m^4$ may range from 5 to 20.

The core formulations may include one or more of any of the terpene-based resins described above. For example, the core formulations may include two or more of any of the terpene-based resins described above. In some embodiments, the terpene-based resin is present in the core formulation in an amount of about 1 phr to about 20 phr. In further embodiments, the terpene-based resin is present in the core formulation in an amount of about 3 phr to about 18 phr. In still further embodiments, the terpene-based resin is present in the core formulation in an amount of about 5 phr to about 15 phr. In yet further embodiments, the terpene-based resin is present in the core formulation in an amount of about 7 phr to about 12 phr. In some embodiments, the terpene-based resin is present in the core formulation in an amount of about 7 phr to 10 phr. For example, a core formulation of the present disclosure may include about 7 phr of a terpene-based resin as disclosed herein.

Additives

Radical scavengers, such as a halogenated organosulfur or metal salt thereof, organic disulfide, or inorganic disulfide compound, may be added to the core formulations of the present disclosure. These compounds also may function as "soft and fast agents." As used herein, a "soft and fast agent" means any compound or a blend thereof that is capable of making a core: 1) softer (having a lower compression) at a constant "coefficient of restitution" (CoR); and/or 2) faster (having a higher COR at equal compression), when compared to a core equivalently prepared without a soft and fast agent. Examples of halogenated organosulfur compounds that may be used with the core formulations include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In some embodiments, the soft and fast agent is selected from ZnPCTP, PCTP, ditolyl disulfide, diphenyl disulfide, dixylyl disulfide, 2-nitroresorcinol, or combinations thereof. In some embodiments, the soft and fast agent may be used in the core formulation in an amount of about 0.1 phr to about 3 phr. In further embodiments, the soft and fast agent may be used in the core formulation in an amount of about 0.2 phr to about 1 phr. For example, the soft and fast agent may be used in the core formulation in an amount of about 0.3 phr to about 0.35 phr.

The core formulations of the present disclosure also may include "fillers," which are added to adjust the density and/or specific gravity of the formulation. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the core formulations include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In some embodiments, the core formulations of the present disclosure include zinc oxide. The zinc oxide may be used in an amount ranging from about 1 phr to about 15 phr. In some embodiments, the zinc oxide may be used in an amount ranging from about 3 phr to about 10 phr, for example, about 5 phr. In further embodiments, the core formulations of the present disclosure include barium sulfate. The barium sulfate may be used in an amount ranging from about 10 phr to about 20 phr, for example, about 12 phr to about 14 phr.

The core formulations may also include antioxidants to prevent the breakdown of the elastomers. In addition, processing aids, such as high molecular weight organic acids and salts thereof, may be added to the formulations.

In some embodiments, the total amount of additive(s) and filler(s) present in the core formulation may be about 15 percent by weight or less, based on the total weight of the core formulation. In other embodiments, the total amount of additive(s) and filler(s) present in the core formulation may be about 12 percent by weight or less, based on the total weight of the core formulation. In still other embodiments, the total amount of additive(s) and filler(s) present in the core formulation may be about 10 percent by weight or less, based on the total weight of the core formulation. In further embodiments, the total amount of additive(s) and filler(s) present in the core formulation may be about 8 percent by weight or less, based on the total weight of the core formulation. In yet further embodiments, the total amount of additive(s) and filler(s) present in the core formulation may be about 5 percent by weight or less, based on the total weight of the core formulation.

Curing the Core Formulation

The base rubber, free radical initiator, cross-linking agent, water releasing agent, terpene-based resin, fillers, and any other materials used in forming the core, in accordance with the present disclosure, may be combined to form a mixture by any type of mixing known to one of ordinary skill in the art. Suitable types of mixing include single pass and multipass mixing, and the like. A single pass mixing process where ingredients are added sequentially is preferred, as this type of mixing tends to increase efficiency and reduce costs for the process. The formulation may be cured using any technique known in the art for rubber compositions for golf balls.

Golf Ball Construction

Figure 2:
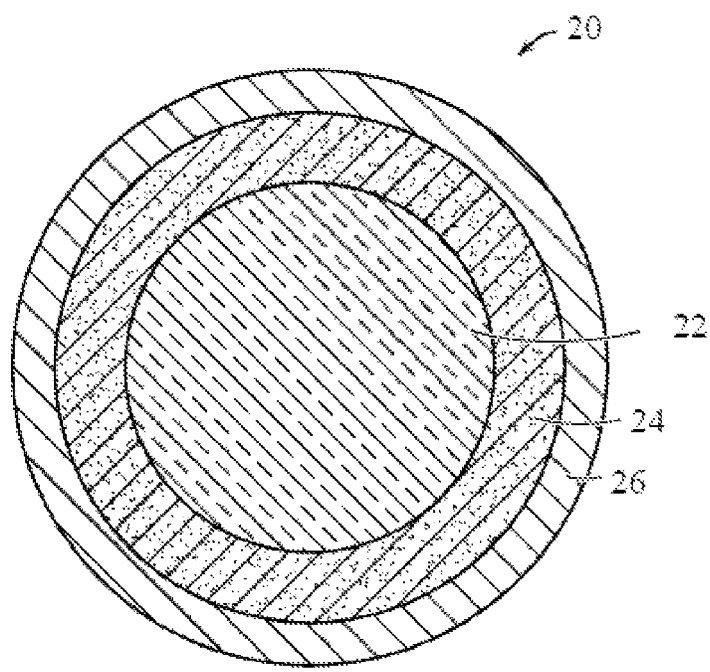
FIG. 2 is a cross-sectional view of a three-piece golf ball in accordance with an embodiment of the present disclosure.
Figure 3:
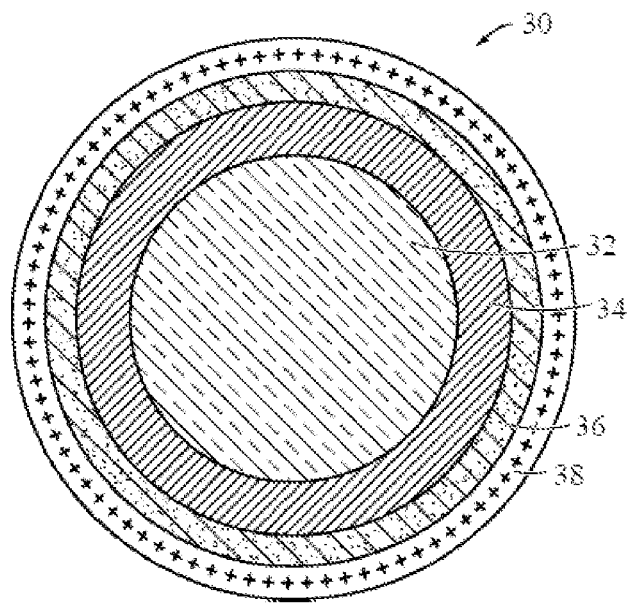
FIG. 3 is a cross-sectional view of a four-piece golf ball in accordance with an embodiment of the present disclosure.
Figure 4:
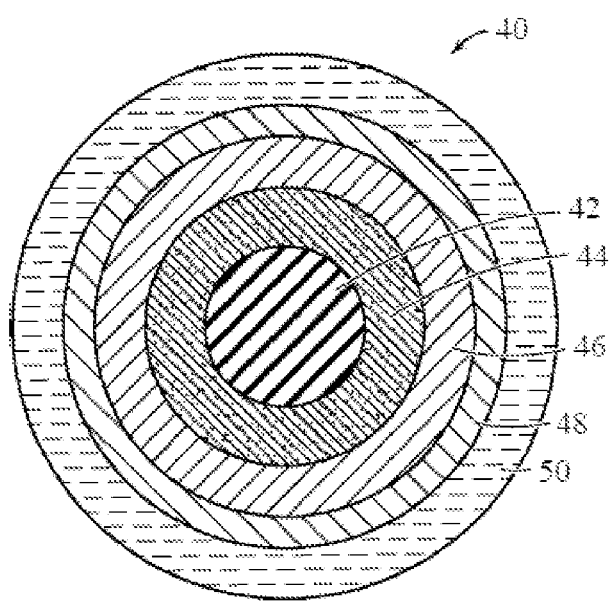
FIG. 4 is a cross-sectional view of a five-piece golf ball in accordance with an embodiment of the present disclosure.

The core formulations of the present disclosure may be used with golf balls of various constructions. In one version, shown in FIG. 1, a golf ball of the present disclosure is a two-piece ball 10 comprising a single core layer 12 and a single cover layer 14. As shown in FIG. 2, in one embodiment, the golf ball 20 comprises a core layer 22, an intermediate layer 24, and a cover layer 26. In FIG. 2, the intermediate layer 24 can be considered an outer core layer, an inner cover layer, a mantle or casing layer, or any other layer disposed between the core 22 and the cover layer 26. Referring to FIG. 3, in another embodiment, a four-piece golf ball 30 comprises an inner core layer 32, an outer core layer 34, an intermediate layer 36, and an outer cover layer 38. In FIG. 3, the intermediate layer 36 may be considered a casing or mantle layer, or inner cover layer, or any other layer disposed between the outer core layer 34 and the outer cover of the ball 38. Referring to FIG. 4, in another version, a five-piece golf ball 40 includes a three-layered core having an inner core layer 42, an intermediate core layer 44, an outer core layer 46, an inner cover layer 48, and an outer cover layer 50. As exemplified herein, a golf ball in accordance with the present disclosure can comprise any combination of any number of core layers, intermediate layers, and cover layers.

The core formulations of the present disclosure may be used with single- or multi-layered cores. The core formulations may be used in one or more layers of the core. In one embodiment, the core formulations described herein may be used in a solid core of a golf ball. In other embodiments, the core formulations described herein may be used in a dual core having an inner core (center) and a surrounding outer core layer. In one embodiment, the inner core layer (center) may be formed of the core formulation of the present disclosure while the outer core layer may be formed of a rubber composition. In another embodiment, the outer core layer may be formed of the core formulation while the inner core layer may be formed of a rubber composition. In other embodiments, both the inner core layer and the outer core layer may be formed of the core formulations of the present disclosure. In still other embodiments, the core formulations described herein may be used in a multi-layered core having three or more layers. For example, the center of the core may be formed of the core formulation of the present disclosure while the other layers of the core may be formed of a rubber composition. In still other embodiments, two or more layers of the core may be formed of the core formulations of the present disclosure.

In some embodiments, when the golf ball core is a dual core or a multi-layered core, the surrounding outer core layer(s) may be formed of a polybutadiene rubber composition. The rubber compositions may contain any of the base rubbers, free radical initiators, cross-linking agents, soft and fast agents, additives, and fillers described above, and the composition may be cured using conventional methods as described above.

In solid core embodiments, the core may have a diameter ranging from about 1.39 inches to about 1.62 inches. In some embodiments, the solid core may have a diameter of about 1.45 inches to about 1.60 inches. In still further embodiments, the solid core may have a diameter of about 1.50 inches to about 1.55 inches.

In dual core embodiments, the inner core (center) may have a diameter of about 0.25 inches to about 1.51 inches. In other embodiments, the inner core (center) may have a diameter of about 0.30 inches to about 1.45 inches. In still other embodiments, the inner core (center) may have a diameter of about 0.50 inches to about 1.30 inches. In further embodiments, the inner core (center) may have a diameter of about 0.75 inches to about 1.15 inches. In still further embodiments, the inner core (center) may have a diameter of about 0.90 inches to about 1.05 inches. For example, the inner core (center) may have a diameter of about 1.01 inches. The dual core, including the center and the outer core layer, may have a diameter of about 1.39 inches to about 1.62 inches. In some embodiments, the dual core has a diameter of about 1.45 inches to about 1.60 inches. In still further embodiments, the dual core has a diameter of about 1.50 inches to about 1.55 inches.

In some embodiments, one or more intermediate layers may be disposed between the single or multi-layered core and surrounding cover layer. These intermediate layers also can be referred to as casing or inner cover layers. The intermediate layer can be formed from any material known in the art, including thermoplastic and thermosetting materials. In some embodiments, the intermediate layer is formed of an ionomer composition including an ethylene acid copolymer containing acid groups that are at least partially neutralized. Suitable ethylene acid copolymers that may be used to form the intermediate layers are generally referred to as copolymers of ethylene; a C3 to C8 $\alpha$, $\beta$-ethylenically unsaturated mono- or dicarboxylic acid; and an optional softening monomer.

A protective cover layer may be disposed over the core and any intermediate layers. The cover layers of the present disclosure provide the ball with a variety of advantageous mechanical properties such as, for example, high impact durability and high shear-resistance levels. The golf ball may contain one or more cover layers. For example, the golf ball may have a single-layered cover. In other embodiments, the golf ball may have a dual-layered cover including inner and outer cover layers. In still other embodiments, the golf ball may have a multi-layered cover including an inner cover layer, one or more intermediate cover layers, and an outer cover layer.

Suitable conventional materials that can be used to form a cover layer include, but are not limited to, polyurethanes; thermoplastic polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® TO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Polyurethanes, polyureas, and hybrids of polyurethanes-polyureas are particularly desirable because these materials can be used to make a golf ball having high resiliency and a soft feel. By the term, "hybrids of polyurethanes-polyureas," it is meant to include copolymers and blends thereof.

Suitable ionomer compositions for cover layers include, for example, partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a C3-C8 α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

In some embodiments, the golf balls of the present disclosure may include a single-layered cover formed from an ionomeric composition, a thermoplastic polyurethane, or a castable polyurethane disposed over a solid core made from the core formulation described herein. In other embodiments, the golf balls of the present disclosure may include a dual-layered cover where the inner cover layer is formed from an ionomeric composition and the outer cover layer is formed from a thermoplastic polyurethane or a castable polyurethane disposed over a solid core made from the core formulation described herein.

In further embodiments, the golf balls of the present disclosure may include a single-layered cover formed from an ionomeric composition, a thermoplastic polyurethane, or a castable polyurethane disposed over a dual core where the inner core (center) is made from the core formulation described herein. In still further embodiments, the golf balls of the present disclosure may include a dual-layered cover, where the inner cover layer is formed from an ionomeric composition and the outer cover layer is formed from a castable polyurethane, disposed over a dual core where the inner core (center) is made from the core formulation described herein.

In some embodiments, the cover may be a single layer having a thickness of about 0.010 inches to about 0.040 inches. In other embodiments, the cover may be a single layer having a thickness of about 0.020 inches to about 0.035 inches. In still further embodiments, the cover may be a single layer having a thickness of about 0.025 inches to about 0.030 inches.

In further embodiments, the cover includes an inner cover layer and an outer cover layer. The inner cover layer may have a thickness ranging from about 0.010 inches to about 0.120 inches. In some embodiments, the inner cover layer may have a thickness ranging from about 0.015 inches to about 0.080 inches. In further embodiments, the inner cover layer may have a thickness ranging from about 0.020 inches to about 0.045 inches. The outer cover layer may have a thickness ranging from about 0.004 inches to about 0.080 inches. In other embodiments, the outer cover layer may have a thickness ranging from about 0.010 inches to about 0.055 inches. In still further embodiments, the outer cover layer may have a thickness ranging from about 0.020 inches to about 0.035 inches. In yet further embodiments, the outer cover layer may have a thickness of less than about 0.020 inches.

Golf Ball Properties

Golf balls having cores formed from the core formulations of the present disclosure have advantageous mechanical and playing performance properties. Without being bound by any particular theory, it is believed that the inclusion of ethylene-propylene-diene (EPDM) rubber, any of the terpene-based resins described above, and/or any of the water releasing agents described above, whether used in combination or individually, in the core formulations of the present disclosure results in an improvement in the durability of golf balls by improving the durability of the golf ball cores.

Additionally, the water releasing agent in the core formulation of the present disclosure serves as a promoter for further decomposition and deactivation of radicals at the center of the core during the curing process, which results in a difference in crosslinking density and an increased hardness gradient between the center and the surface of the core. The increased hardness gradient of the core can reduce the spin rate (or the rate of rotation) of the golf ball after it is hit by a club. Balls having a relatively high spin rate can be difficult to control in drives and travel shorter in distance, particularly for recreational players. The golf balls having cores made in accordance with the present disclosure have higher driver velocity off the tee, higher launch angles, and lower driver spin. Thus, the ball can travel far distances and the ball's flight path can be controlled more easily. This velocity and control allow the player to make better driver shots.

Hardness of Core

The center or inner core layer of the golf balls of the present disclosure have a "positive" hardness gradient (that is, the outer surface of the inner core is harder than its geometric center). The positive hardness gradient of the inner core is defined by hardness measurements made at the outer surface of the inner core and radially inward towards the center of the inner core. These measurements are made typically at 2-mm increments as described in the test methods below.

In some embodiments, the inner core layer has a geometric center hardness of about 40 Shore C to about 70 Shore C. In other embodiments, the inner core layer has a geometric center hardness of about 45 Shore C to about 65 Shore C. In further embodiments, the inner core layer has a geometric center hardness of about 50 Shore C to about 60 Shore C. In still further embodiments, the inner core layer has a geometric center hardness of about 50 Shore C to about 55 Shore C. For example, in one embodiment, the inner core layer may have a geometric center hardness of about 55 Shore C.

In further embodiments, the inner core layer has an outer surface hardness of about 60 Shore C to about 105 Shore C. In still further embodiments, the inner core layer has an outer surface hardness of about 70 Shore C to about 105 Shore C. In some embodiments, the inner core layer has an outer surface hardness of about 80 Shore C to about 100 Shore C. In still further embodiments, the inner core layer has an outer surface hardness of about 85 Shore C to about 95 Shore C. In yet further embodiments, the inner core layer has an outer surface hardness of about 85 Shore C to about 90 Shore C. For instance, in one embodiment, the inner core layer may have an outer surface hardness of about 89 Shore C. In another embodiment, the inner core layer may have an outer surface hardness of about 91 Shore C.

The inner core layer of the present disclosure may have a positive hardness gradient, for instance, a positive Shore C hardness gradient, of at least about 25. That is, the difference between the outer surface hardness and the geometric center hardness of the inner core layer may be at least about 25. In further embodiments, the inner core layer may have a positive hardness gradient of at least about 30. In some embodiments, the inner core layer may have a positive hardness gradient of at least about 33. In still other embodiments, the inner core layer may have a positive hardness gradient of at least about 36. In further embodiments, the inner core layer may have a positive hardness gradient of at least about 40. For example, the positive hardness gradient of the inner core layer may range from about 25 to about 50. In other embodiments, the positive hardness gradient of the inner core layer may range from about 30 to about 40.

In embodiments where the golf ball includes a dual core or a multi-layered core, the inner core may have a positive hardness gradient and the outer core layer(s) may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer). In other embodiments where the golf ball includes a dual core or a multi-layered core, the inner core layer and the other layers of the core (e.g., the outer core layer) may have a positive hardness gradient.

Core Component Relationships

As discussed above, the core formulations of the present disclosure may include two or more of the following additives: ethylene-propylene-diene (EPDM) rubber, any of the terpene-based resins described above, and/or any of the water releasing agents described above, in the core formulations of the present disclosure to improve the impact durability of the cores and resulting golf balls. In one embodiment, the rubber core formulations of the present disclosure may include EPDM rubber and a terpene-based resin as additives. In another embodiment, the core formulations of the present disclosure may include EPDM rubber and a water-releasing agent as additives. In still another embodiment, the core formulations of the present disclosure may include a terpene-based resin and a water releasing agent as additives. In yet other embodiments, the core formulations of the present disclosure may include EPDM rubber, a terpene-based resin, and a water releasing agent as additives.

In one embodiment, the amount of EPDM rubber present in the rubber formulation used to form the core is related to the hardness gradient of the core, according to the relationship shown in Equation I below:

$$\frac{EPDM_C}{1 - \frac{1}{H_{Gr}}} \leq 250 \tag{I}$$

where $EPDM_C$ represents the concentration of EPDM rubber in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In other embodiments, the amount of EPDM rubber present in the rubber formulation used to form the core is related to the hardness gradient of the core, according to the relationship shown in Equation II below:

$$30 \leq \frac{EPDM_C}{1 - \frac{1}{H_{Gr}}} \leq 150 \tag{II}$$

where $EPDM_C$ represents the concentration of EPDM rubber in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In another embodiment, the amount of terpene-based resin present in the rubber formulation used to form the core is related to the hardness gradient of the core, according to the relationship shown in Equation III below:

$$\frac{TBR_C}{1 - \frac{1}{H_{Gr}}} \leq 750 \tag{III}$$

where $TBR_C$ represents the concentration of terpene-based resin in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In other embodiments, the amount of terpene-based resin present in the rubber formulation used to form the core is related to the hardness gradient of the core, according to the relationship shown in Equation IV below:

$$30 \leq \frac{TBR_C}{1 - \frac{1}{H_{Gr}}} \leq 500 \tag{IV}$$

where $TBR_C$ represents the concentration of terpene-based resin in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In still other embodiments, the amount of terpene-based resin present in the rubber formulation used to form the core is related to the hardness gradient of the core, according to the relationship shown in Equation V below:

$$30 \leq \frac{TBR_C}{1 - \frac{1}{H_{Gr}}} \leq 350 \quad (V)$$

where $TBR_C$ represents the concentration of terpene-based resin in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \geq H_{Gr} \geq 50$.

In still another embodiment, the amount of water releasing agent present in the rubber formulation used to form the core is related to the hardness gradient of the core, according to the relationship shown in Equation VI below:

$$\frac{WRA_C}{1 - \frac{1}{H_{Gr}}} \leq 200 \quad (VI)$$

where $WRA_C$ represents the concentration of water releasing agent in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \geq H_{Gr} \geq 50$.

In further embodiments, the amount of water releasing agent present in the rubber formulation used to form the core is related to the hardness gradient of the core, according to the relationship shown in Equation VII below:

$$30 \leq \frac{WRA_C}{1 - \frac{1}{H_{Gr}}} \leq 150 \quad (VII)$$

where $WRA_C$ represents the concentration of water releasing agent in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \geq H_{Gr} \geq 50$.

In still further embodiments, the amount of water releasing agent present in the rubber formulation used to form the core is related to the hardness gradient of the core, according to the relationship shown in Equation VIII below:

$$30 \leq \frac{WRA_C}{1 - \frac{1}{H_{Gr}}} \leq 100 \quad (VIII)$$

where $WRA_C$ represents the concentration of water releasing agent in the rubber formulation in parts per hundred and $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \geq H_{Gr} \geq 50$.

In some embodiments, the core rubber formulations of the present disclosure include an amount of EPDM rubber and an amount of terpene-based resin such that the following equations are satisfied: (i) Equation I and/or II, and (ii) Equation III, IV, and/or V. In other embodiments, the core rubber formulations of the present disclosure include an amount of EPDM rubber and an amount of water releasing agent such that the following equations are satisfied: (i) Equation I and/or II, and (ii) Equation VI, VII, and/or VIII. In still other embodiments, the core rubber formulations of the present disclosure include an amount of terpene-based resin and an amount of water releasing agent such that the following equations are satisfied: (i) Equation III, IV, and/or V, and (ii) Equation VI, VII, and/or VIII. In yet other embodiments, the core rubber formulations of the present disclosure include an amount of EPDM rubber, an amount of terpene-based resin, and an amount of water releasing agent such that the following equations are satisfied: (i) Equation I and/or II, and (ii) Equation III, IV, and/or V, and (iii) Equation VI, VII, and/or VIII.

Compression

The cores of the golf balls of the present disclosure exhibit superior compression values. In some embodiments, the cores made from the formulations described herein have a compression of about 30 to about 90. In other embodiments, the cores made from the formulations described herein have a compression of about 40 to about 85. In still further embodiments, the cores made from the formulations described herein have a compression of about 45 to about 80. In further embodiments, the cores made from the formulations described herein have a compression of about 60 to about 80.

The finished golf balls of the present disclosure may have a compression ranging from about 70 to about 110. In other embodiments, the finished golf balls may have a compression ranging from about 75 to about 105. In still other embodiments, the finished golf balls may have a compression ranging from about 80 to about 100. In still further embodiments, the finished golf balls may have a compression ranging from about 85 to about 95.

Coefficient of Restitution (CoR)

The cores of the golf balls of the present disclosure also exhibit superior coefficient of restitution (CoR) values. In some embodiments, the overall CoR of the cores of the present disclosure at 125 ft/s is at least about 0.775. In other embodiments, the overall CoR of the cores of the present disclosure at 125 ft/s is at least about 0.780. In further embodiments, the overall CoR of the cores of the present disclosure at 125 ft/s is at least about 0.785. In still further embodiments, the overall CoR of the cores of the present disclosure at 125 ft/s is at least about 0.790. In other embodiments, the overall CoR of the cores of the present disclosure at 125 ft/s is at least about 0.795. In yet other embodiments, the overall CoR of the cores of the present disclosure at 125 ft/s is at least about 0.800.

The finished golf balls of the present disclosure may have an overall CoR of at least about 0.750. In other embodiments, the finished golf balls of the present disclosure may have an overall CoR of at least about 0.760. In still other embodiments, the finished golf balls of the present disclosure may have an overall CoR of at least about 0.770. In further embodiments, the finished golf balls have an overall CoR of at least about 0.780. In still further embodiments, the finished golf balls have an overall CoR of at least about 0.790. For example, the finished golf balls have an overall CoR of at least about 0.800. The superior compression and CoR properties allow players to generate greater ball velocity off the tee and achieve greater distance with their drives.

Spin Rate

As briefly discussed above, the increased hardness gradient of the cores of the present disclosure can reduce the spin rate (or the rate of rotation) of the golf ball after it is hit by a club. A lower spin rate after club impact contributes to straighter shots when the ball is mis-hit, greater efficiency in flight, and shots having longer distances. The golf balls made with cores formulated in accordance with the present disclosure exhibit lower spin rates when compared to golf balls formed with cores without the additives described herein.

In some embodiments, the golf balls of the present disclosure have a driver spin rate of about 2900 revolutions per minute (rpm) or less at a ball speed of about 150 miles per hour (mph). For example, the golf balls of the present disclosure have a driver spin rate of about 2700 rpm to about 2900 rpm at a ball speed of about 150 mph. In further embodiments, the golf balls of the present disclosure have a driver spin rate of about 2800 rpm to about 2900 rpm at a ball speed of about 150 mph. In other embodiments, the golf balls of the present disclosure have a driver spin rate of about 2750 rpm or less at a ball speed of about 183 mph. For instance, the golf balls of the present disclosure have a driver spin rate of about 2500 rpm to about 2750 rpm at a ball speed of about 183 mph. In still further embodiments, the golf balls of the present disclosure have a driver spin rate of about 2600 rpm to about 2750 rpm at a ball speed of about 183 mph.

EXAMPLES

The following non-limiting examples demonstrate golf balls and golf ball cores that may be made in accordance with the present disclosure. The examples are merely illustrative of the preferred embodiments of the present disclosure and are not to be construed as limiting the disclosure, the scope of which is defined by the appended claims.

Example 1: Exemplary Core Formulation for Solid Core

Table 1 below shows an exemplary core formulation for a solid core. As shown in Table 1, both ethylene-propylene-diene (EPDM) rubber and any of the terpene-based resins described above can be used in the core formulation.

TABLE 1

Core Formulation for Solid Core

|  |  | Example 1 Core Composition (phr) |
|---|---|---|
| Base Rubber | High cis-1,4 polybutadiene (Buna CB 1221) | 100 |
|  | EPDM (Dow Nordel ® IP 5565 EPDM) | 5 |
| Cross-linking agent | Zinc diacrylate (ZDA) | 30 |
| Free radical initiator | Dicumyl peroxide (Perkadox ® BC) | 1 |
| Terpene-based Resin |  | 7 |
| Water releasing agent | Calcium sulfate dihydrate | 0 |
| Fillers | Zinc oxide (ZnO) | 5 |
|  | Barium sulfate | as needed for weight |

Example 2: Exemplary Core Formulation for Solid Core

Table 2 below shows an exemplary core formulation for a solid core. As shown in Table 2, any of the terpene-based resins described above and a water releasing agent may be used in the core formulation.

TABLE 2

Core Formulation for Solid Core

|  |  | Example 2 Core Composition (phr) |
|---|---|---|
| Base Rubber | High cis-1,4 polybutadiene (Buna CB 1221) | 100 |
|  | EPDM (Dow Nordel ® IP 5565 EPDM) | 0 |
| Cross-linking agent | Zinc diacrylate (ZDA) | 30 |
| Free radical initiator | Dicumyl peroxide (Perkadox ® BC) | 1 |
| Terpene-based Resin |  | 7 |
| Water releasing agent | Calcium sulfate dihydrate | 3 |
| Fillers | Zinc oxide (ZnO) | 5 |
|  | Barium sulfate | as needed for weight |

Example 3: Exemplary Core Formulation for Solid Core

Table 3 below shows an exemplary core formulation for a solid core. As shown in Table 3, a combination of EPDM rubber, any of the terpene-based resins described above, and a water releasing agent may be used in the core formulation.

TABLE 3

|  |  | Example 3 Core Composition (phr) |
|---|---|---|
| Base Rubber | High cis-1,4 polybutadiene (Buna CB 1221) | 100 |
|  | EPDM (Dow Nordel ® IP 5565 EPDM) | 3 |
| Cross-linking agent | Zinc diacrylate (ZDA) | 30 |
| Free radical initiator | Dicumyl peroxide (Perkadox ® BC) | 1 |
| Terpene-based Resin |  | 7 |
| Water releasing agent | Calcium sulfate dihydrate | 3 |
| Fillers | Zinc oxide (ZnO) | 5 |
|  | Barium sulfate | as needed for weight |

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the golf balls in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
a core having an outer surface and a geometric center, wherein the core is formed from a rubber composition cured under heat, the rubber composition comprising:
a base rubber comprising polybutadiene rubber, ethylene-propylene-diene (EPDM) rubber, or a mixture thereof,
a free radical initiator,
a cross-linking co-agent,
a terpene-based resin comprising a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof, and
a water releasing agent comprising a metal sulfate hydrate having one to four waters of hydration, wherein the water releasing agent is present in the rubber composition in an amount of about 1 phr to about 3.9 phr,
wherein the geometric center and the outer surface each has a hardness and the hardness of the outer surface is greater than the hardness of the geometric center to define a positive Shore C hardness gradient of at least 25; and
a cover layer surrounding the core.

2. The golf ball of claim 1, wherein the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof.

3. The golf ball of claim 1, wherein the terpene-based resin is present in the rubber composition in an amount of about 1 phr to about 20 phr.

4. The golf ball of claim 1, wherein the water releasing agent is present in an amount of about 1 to about 3 phr.

5. The golf ball of claim 1, wherein the hardness of the geometric center ranges from about 45 Shore C to about 65 Shore C and the hardness of the outer surface ranges from about 70 Shore C to about 100 Shore C.

6. The golf ball of claim 1, wherein the core has a compression of about 10 to about 110.

7. A golf ball, comprising:
a dual core comprising an outer core layer disposed over an inner core layer, wherein at least one of the outer core layer or the inner core layer is formed of a rubber composition cured under heat, the rubber composition comprising:
a base rubber comprising polybutadiene rubber, ethylene-propylene-diene (EPDM) rubber, or a mixture thereof,
an organic peroxide,
a cross-linking co-agent,
a terpene-based resin comprising a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof,
a water releasing agent comprising a metal sulfate hydrate having one to four waters of hydration and present in the rubber composition in an amount of about 1 phr to about 3.9 phr,
wherein the layer formed of the rubber composition has an outer surface and a geometric center, each having a hardness, and the hardness of the outer surface is greater than the hardness of the geometric center to define a positive Shore C hardness gradient of at least 25; and
a cover layer surrounding the dual core.

8. The golf ball of claim 7, wherein the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof.

9. The golf ball of claim 7, wherein the terpene-based resin is present in the rubber composition in an amount of about 1 phr to about 15 phr.

10. The golf ball of claim 7, wherein the metal is an alkaline earth metal.

11. The golf ball of claim 7, wherein the water releasing agent is selected from calcium sulfate dihydrate, zinc sulfate dihydrate, or combinations thereof.

12. The golf ball of claim 7, wherein the water releasing agent is present in the rubber composition in an amount of about 1 phr to about 3.75 phr.

13. The golf ball of claim 7, wherein the positive Shore C hardness gradient is about 30 to 50.

14. The golf ball of claim 7, wherein the cross-linking co-agent is present in the rubber composition in an amount of about 5 phr to 45 phr.

15. A golf ball, comprising:
a multi-layered core comprising a center and at least two core layers formed around the center, wherein at least one of the center or the at least two core layers is formed of a rubber composition cured under heat, the rubber composition comprising:
a base rubber comprising a mixture of polybutadiene rubber and ethylene-propylene-diene (EPDM) rubber,
an organic peroxide,
a cross-linking co-agent,
a terpene-based resin comprising a terpene polymer, a terpene-phenol copolymer, a terpene-styrene copolymer, a terpene-phenol-styrene copolymer, a hydrogenated terpene-phenol copolymer, a hydrogenated terpene-styrene copolymer, a hydrogenated terpene-phenol-styrene copolymer, or combinations thereof, wherein the terpene-based resin is present in the rubber composition in an amount of about 5 phr to about 15 phr,
a water releasing agent comprising a metal sulfate hydrate having one to four waters of hydration, wherein the water releasing agent is present in the rubber composition in an amount of about 1 phr to about 3.9 phr,
wherein the layer formed of the rubber composition has an outer surface and a geometric center, each having a hardness, and the hardness of the outer surface is greater than the hardness of the geometric center to define a positive Shore C hardness gradient of at least 30; and
a cover layer surrounding the multi-layered core.

16. The golf ball of claim 15, wherein the polybutadiene is present in the mixture in an amount of about 70 phr to about 99 phr and the EPDM rubber is present in the mixture in an amount of about 1 phr to about 30 phr.

17. The golf ball of claim 15, wherein the organic peroxide comprises dimethyl terbutyl peroxide, dicumyl peroxide, or combinations thereof.

18. The golf ball of claim 15, wherein the cross-linking co-agent comprises a zinc salt of an acrylate, diacrylate, methacrylate, or dimethacrylate.

19. The golf ball of claim 15, wherein the terpene-based resin is selected from α-pinene polymer, β-pinene polymer, limonene polymer, dipentene polymer, β-pinene/limonene polymer, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer, or combinations thereof.

20. The golf ball of claim 15, wherein the water releasing agent is selected from calcium sulfate dihydrate, zinc sulfate dihydrate, or combinations thereof.

\* \* \* \* \*